Figure 1:
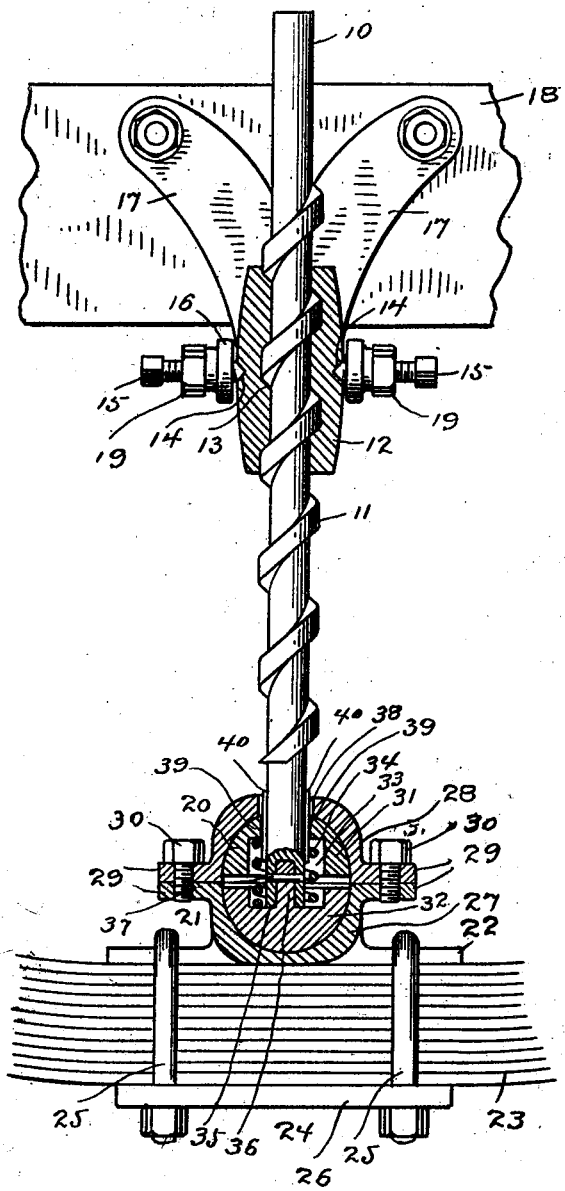

No. 828,610.    PATENTED AUG. 14, 1906.
F. KNIGHT.
DOUBLE RECOIL TAKE-UP.
APPLICATION FILED DEC. 26, 1905.

WITNESSES
H. A. Lamb.
S. W. Atherton.

INVENTOR
Frank Knight
BY
A. M. Wooster
ATTORNEY

UNITED STATES PATENT OFFICE.

FRANK KNIGHT, OF DERBY, CONNECTICUT.

DOUBLE-RECOIL TAKE-UP.

No. 828,610.  Specification of Letters Patent.  Patented Aug. 14, 1906.

Application filed December 26, 1905. Serial No. 293,341.

*To all whom it may concern:*

Be it known that I, FRANK KNIGHT, a citizen of the United States, residing at Derby, county of New Haven, State of Connecticut, have invented a new and useful Double-Recoil Take-Up, of which the following is a specification.

This invention has for its object to provide a double-recoil take-up for use upon heavy guns and upon passenger and freight cars and heavy road-vehicles—as, for example, motor-cars—which without impairing the resiliency of the springs will take up the recoil thereof and cause a car to ride very much easier by preventing the excessive rebound of the body when moving rapidly over a rough road and will prevent breaking of the springs.

With these and other objects in view I have devised the novel double-recoil take-up of which the following description, in connection with the accompanying drawings, is a specification, reference characters being used to indicate the several parts.

Figure 2:
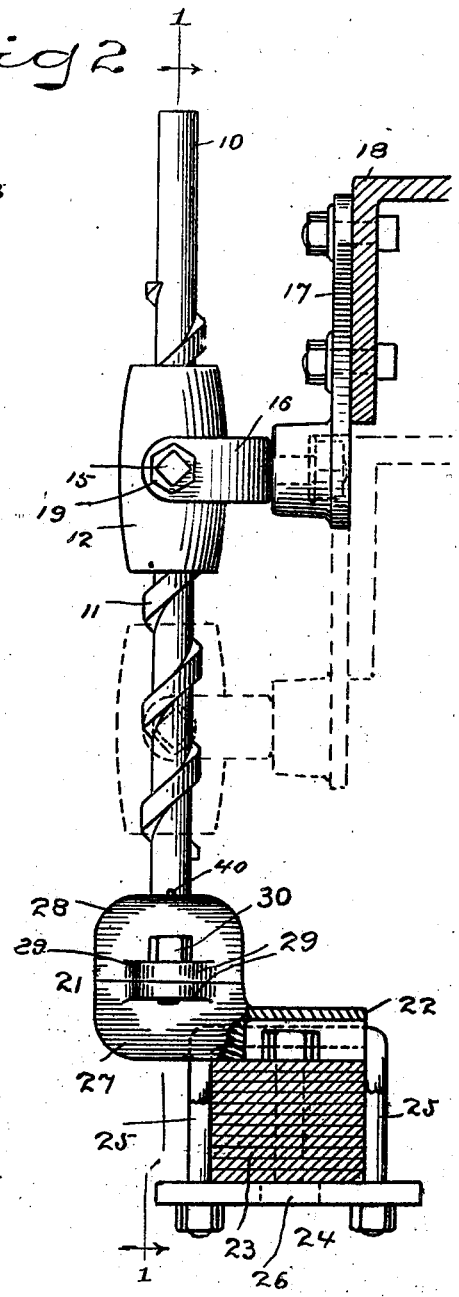

Figure 1 is a view, partly in elevation and partly in section, illustrating the application of my novel double-recoil take-up to a motor-car; and Fig. 2 is an elevation from a point of view at right angles to the point of view in Fig. 1, a spring and a portion of the car to which the sliding hub is attached being shown in section.

My novel take-up comprises, essentially, a rod which has a spiral sliding engagement with a hub and is provided at one end with a ball which is seated in a friction-socket, so that in use the rod and ball will oscillate and the rod and the hub will move longitudinally relatively to each other. 10 indicates the rod which is provided with a spiral, in the present instance a worm, (indicated by 11,) which engages a corresponding spiral groove 13 in a hub, (indicated by 12.) The hub is shown as provided with recesses 14, which are engaged by the points of set-screws 15, carried by a yoke 16, which in turn is swiveled in a bracket 17, rigidly secured to a fixed portion, as the chassis, of a motor-car, (indicated by 18,) the set-screws being locked in place after adjustment by set-nuts 19. At the lower end of the rod is a ball 20, which lies in a friction-socket 21, carried by a plate 22, which is rigidly secured to another portion of the car, as to a spring 23, the plate being shown as secured to the spring by a clip 24, comprising two U-bolts 25 and a plate 26. The socket, as shown, consists of a base 27 and a cap 28, each provided with flanges 29, which are secured together by bolts 30. The ball is preferably made in two parts, (indicated specifically by 31 and 32.) Within the two parts of the ball is a recess 33, which receives a spring 34, which bears against the parts of the ball and acts to separate them and retain them in close engagement with the parts of the socket, as clearly shown in Fig. 1. The lower end of the rod passes through part 31 of the ball and is provided with a recess 35, which receives a stud 36, projecting upward from the bottom of the recess in part 32 of the ball, the rod being rigidly secured to the stud by means of a pin 37. The cap of the socket is provided with a hole 38, through which the rod passes freely, and part 31 of the ball is provided with grooves 39, which receive ribs 40 on the rod, whereby said part 31 is held against rotation, but is left free to slide on the rod, the spring, as already stated, holding the parts of the ball in close engagement with the socket.

The operation will be readily understood from the drawings, Fig. 2 showing a dotted position of the hub as in use. The tendency in rough riding is for the body of the car to move toward and from the spring. This rebounding of the body through the resilience of the spring is resisted by the take-up, the action of which is as follows: In use the rod and hub move vertically relatively to each other, the rod sliding through the hub and being oscillated through the engagement of the spiral therewith, the movement being in one direction when the hub moves downward and in the opposite direction when the hub moves upward. The resistance to the longitudinal movement of the rod and hub relatively to each other caused by the friction between the ball and the socket and also between the rod and the hub takes up and exhausts the rebound of the body. In other words, while the resilience of the spring is not impaired excessive rebound of the body is prevented by the friction of the parts of the take-up and danger of the breaking of springs in rough riding is practically eliminated. For use upon light work the friction of the parts of the take-up may be diminished by reducing the size of the ball and socket and by increasing the pitch of the spiral, and for especially heavy work the friction may be increased by increasing the size of the ball and socket or by diminishing the pitch of the spiral or by providing a double spiral connection between the rod and the hub.

Another use of my novel take-up is upon heavy guns to take up the recoil after firing.

Having thus described my invention, I claim—

1. A recoil take-up comprising a hub adapted for attachment to a moving part and a rod having a sliding spiral engagement with said hub and at one end an expansible ball and a socket in which the ball is seated and which is adapted for attachment to another moving part, so that in use said rod and hub will have longitudinal movement relatively to each other and the ball will be oscillated in the socket.

2. A recoil take-up comprising a hub adapted for attachment to a moving part, a rod having a spiral engaging the hub and at one end a divided expansible member, a socket adapted for attachment to another moving part in which the said expansible member is seated, and means normally acting to retain the parts of the member in engagement with the socket.

3. A recoil take-up comprising a hub adapted for attachment to a moving part, a rod having a spiral engaging the hub and at one end a two-part ball, a socket adapted for attachment to another moving part in which the ball is seated, and a spring acting to retain the parts of the ball in engagement with the socket.

4. A recoil take-up comprising a hub adapted for attachment to a moving part, a rod adapted for attachment to another moving part and having a spiral engaging the hub and at its lower end a two-part ball, the rod passing through one of the parts of the ball and being rigidly secured to the other part and said parts being provided with a recess, a spring in said recess acting to hold the parts of the ball separated and a socket in which the ball is seated.

5. A recoil take-up comprising a hub adapted for attachment to a moving part, a rod adapted for attachment to another moving part and having a spiral engaging the hub and at its lower end a two-part ball, a spring adapted to hold the parts of the ball separated and a socket for said ball comprising a base and a cap through which the rod passes, both of said parts being provided with flanges, and bolts in said flanges, whereby the parts of the socket are secured together.

6. A recoil take-up comprising a hub adapted for attachment to a moving part, a rod having a spiral engaging the hub and at one end a two-part ball, a spring acting to retain the parts of the ball separated and a two-part socket adapted for attachment to another moving part in which the ball is seated.

7. A recoil take-up comprising a hub adapted for attachment to a moving part, a rod having a spiral engaging the hub and ribs 40, a ball comprising two parts formed with a recess and a spring in said recess, one of the parts of the ball being provided with a stud to which the rod is secured, the rod passing through the other part which is provided with grooves to receive the ribs, whereby said part is held against rotation but is left free to move longitudinally on the rod and a socket in which the ball is seated.

In testimony whereof I affix my signature in presence of two witnesses.

FRANK KNIGHT.

Witnesses:
  A. M. WOOSTER,
  S. W. ATHERTON.